(12) United States Patent
Okazaki et al.

(10) Patent No.: US 6,979,801 B2
(45) Date of Patent: Dec. 27, 2005

(54) GLOW PLUG WITH BUILT-IN COMBUSTION PRESSURE SENSOR AND MANUFACTURING METHOD THEREOF

(75) Inventors: Koji Okazaki, Aichi (JP); Mitsuru Kondo, Aichi (JP); Tomohiro Fuma, Aichi (JP); Takahiro Suzuki, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 61 days.

(21) Appl. No.: 10/801,196

(22) Filed: Mar. 16, 2004

(65) Prior Publication Data

US 2004/0182145 A1 Sep. 23, 2004

(30) Foreign Application Priority Data

Mar. 17, 2003 (JP) .................................... 2003-071641

(51) Int. Cl.⁷ ................................................ F23Q 7/22
(52) U.S. Cl. ................................ 219/270; 123/145 A
(58) Field of Search ........................... 219/270, 544, 219/541; 123/145 A, 145 R; 29/611 T

(56) References Cited

U.S. PATENT DOCUMENTS

| | | | | |
|---|---|---|---|---|
| 4,914,751 A | * | 4/1990 | Masaka et al. | 219/270 |
| 5,146,881 A | * | 9/1992 | Pfefferle | 123/145 A |
| 5,922,229 A | * | 7/1999 | Kurano | 219/270 |
| 6,756,722 B2 | * | 6/2004 | Hiramatsu | 313/144 |
| 2002/0195917 A1 | | 12/2002 | Hiramatsu | |

FOREIGN PATENT DOCUMENTS

| | | | | |
|---|---|---|---|---|
| JP | 59-60237 | | 4/1984 | |
| JP | 59-85932 | | 5/1984 | |
| JP | 59085932 | * | 5/1984 | ........... G01L/23/10 |
| JP | 7-139736 A | | 5/1995 | |
| JP | 2002-327919 A | | 11/2002 | |

* cited by examiner

Primary Examiner—Robin O. Evans
Assistant Examiner—Leonid M Fastovsky
(74) Attorney, Agent, or Firm—Sughrue Mion, PLLC

(57) ABSTRACT

A glow plug includes a cylindrical housing having an inward protrusion extending radially inwardly, a threaded portion for screwing the glow plug in an engine plug hole and a sealing portion in a front side of the male threaded portion for airtightly engaging the housing with a given portion of the plug hole, a sheath having a rear sheath end portion airtightly fixed in the housing, a heater disposed in the sheath, a center electrode disposed in the housing and having a front electrode end portion electronically connected with the heater and mechanically connected with the sheath and an outward protrusion protruding radially outwardly, and a combustion pressure sensor having a pressure-sensitive element arranged between a front surface of the inward protrusion and a rear surface of the outward protrusion to generate an electrical signal in response to variations in stress applied thereto.

10 Claims, 8 Drawing Sheets

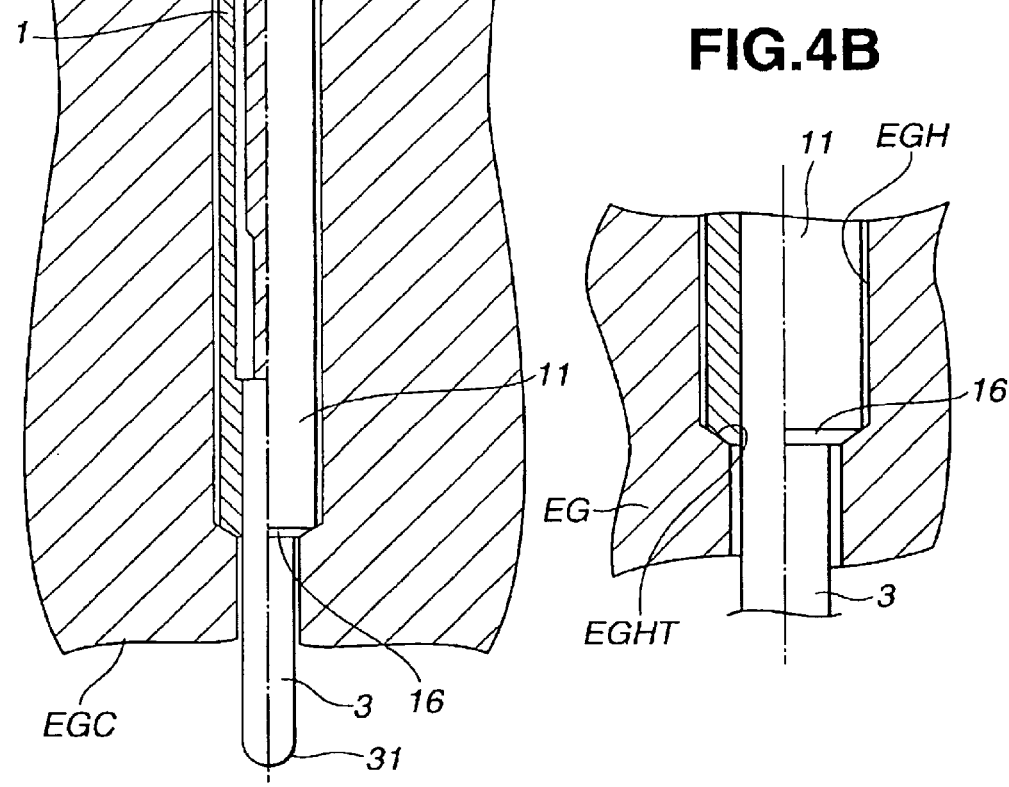

GLOW PLUG WITH BUILT-IN COMBUSTION PRESSURE SENSOR AND MANUFACTURING METHOD THEREOF

BACKGROUND OF THE INVENTION

The present invention relates to a glow plug for an internal combustion engine, such as a diesel engine, and more particularly to a glow plug having a built-in combustion pressure sensor. The present invention also relates to a manufacturing method of a glow plug with a built-in combustion pressure sensor.

Hereinafter, the term "front" refers to a heating end side with respect to the axial direction of a glow plug, and the term "rear" refers to a side opposite the front side.

Japanese Laid-Open Patent Publication No. 2002-327919 discloses a glow plug with a built-in combustion pressure sensor. The disclosed glow plug includes a cylindrical plug housing, a sheath partly fixed in a front end portion of the housing, a heating element disposed in the sheath and a metallic center electrode disposed in the housing for power supply to the heating element. At least part of the combustion pressure sensor is disposed between a rear end portion of the housing and a rear end portion of the center electrode. The combustion pressure sensor has a piezoelectric element under compressive stress and produces an output in response to variations in the stress.

SUMMARY OF THE INVENTION

When the above-disclosed glow plug is mounted in an internal combustion engine, however, the compressive stress previously exerted on the piezoelectric element becomes decreased. The compressive stress on the piezoelectric element further decreases with increase in engine combustion pressure. As a result, there arises a possibility that the output of the piezoelectric element cannot be obtained due to such decreases in the compressive stress on the piezoelectric element.

It is therefore an object of the present invention to provide a glow plug having a built-in combustion pressure sensor capable of detecting variations in combustion pressure without fail.

It is also an object of the present invention to provide a manufacturing process of a glow plug with a built-in combustion pressure sensor.

According to a first aspect of the invention, there is provided a glow plug for an internal combustion engine, comprising: a cylindrical housing having front and rear housing end portions, an inward protrusion protruding radially inwardly from the rear housing end portion, a threaded portion formed between the front and rear housing end portions for screwing the glow plug in a plug hole of the engine and a sealing portion formed on a front side of the threaded portion for engaging the housing with a given portion of the plug hole to form an airtight seal between the housing and the plug hole; a sheath having a front sheath end portion projecting from the housing and a rear sheath end portion airtightly fixed in the front housing end portion; a heater disposed in the sheath and generating heat upon energization thereof; a center electrode disposed in the housing and having a front electrode end portion, a rear electrode end portion projecting from the housing and an outward protrusion protruding radially outwardly at a location between the front and rear electrode end portions, the center electrode being electronically connected at the front electrode end portion with the heater and mechanically connected with the sheath or with the sheath and the heater; and a combustion pressure sensor having a pressure-sensitive element held between a front surface of the inward protrusion and a rear surface of the outward protrusion to generate an electrical signal in response to variations in stress applied thereto.

According to a second aspect of the invention, there is provided a method for manufacturing a glow plug, comprising: disposing a heater in a sheath; fitting a rear end portion of the sheath into a cylindrical housing shell, the housing shell having a rear end portion formed with a sensor seat on an inner surface thereof; inserting an electrode rod into the housing shell; after said inserting, placing a first piece that defines an outward protrusion on the electrode rod, a pressure-sensitive element and a second piece that defines an inward protrusion on the housing shell, on the sensor seat of the housing shell so as to hold the pressure-sensitive element between a rear surface of the outward protrusion and a front surface of the inward protrusion; while pushing the second piece toward the front and applying compressive stress to the pressure-sensitive element, fixing the second piece to the housing shell; and fixing the first piece to the electrode rod.

According to a third aspect of the invention, there is provided a glow plug for an internal combustion engine, comprising: a cylindrical housing having a threaded portion for screwing the glow plug into a plug hole of the engine and a sealing portion formed on a front side of the threaded portion for engaging the housing with a given portion of the plug hole to form an airtight seal between the housing and the plug hole; a sheath having a front sheath end portion projecting from the housing and a rear sheath end portion airtightly fixed in the housing; a heater disposed in the sheath and generating heat upon energization thereof; a center electrode disposed in the housing and having a rear electrode end portion projecting from the housing, the center electrode being electrically connected with the heater and mechanically connected with the sheath or the sheath and the heater; and a combustion pressure sensor including a pressure-sensitive element that converts an axial displacement of the sheath or the sheath and the heater caused by a variation in combustion pressure into an electrical signal and being configured to have compressive stress increasingly applied to the pressure-sensitive element by screwing the glow plug into the plug hole and increased with increase in the combustion pressure.

The other objects and features of the invention will also become understood from the following description.

BRIEF DESCRIPTION OF THE DRAWINGS

FIG. 4A is a schematic illustration of the structure for fixing the glow plug in an engine plug hole according to the first embodiment of the present invention.

FIG. 4B is an enlarged half-sectional view of the engagement of the glow plug in the plug hole according to the first embodiment of the present invention.

DESCRIPTION OF THE EMBODIMENTS

Figure 1A:
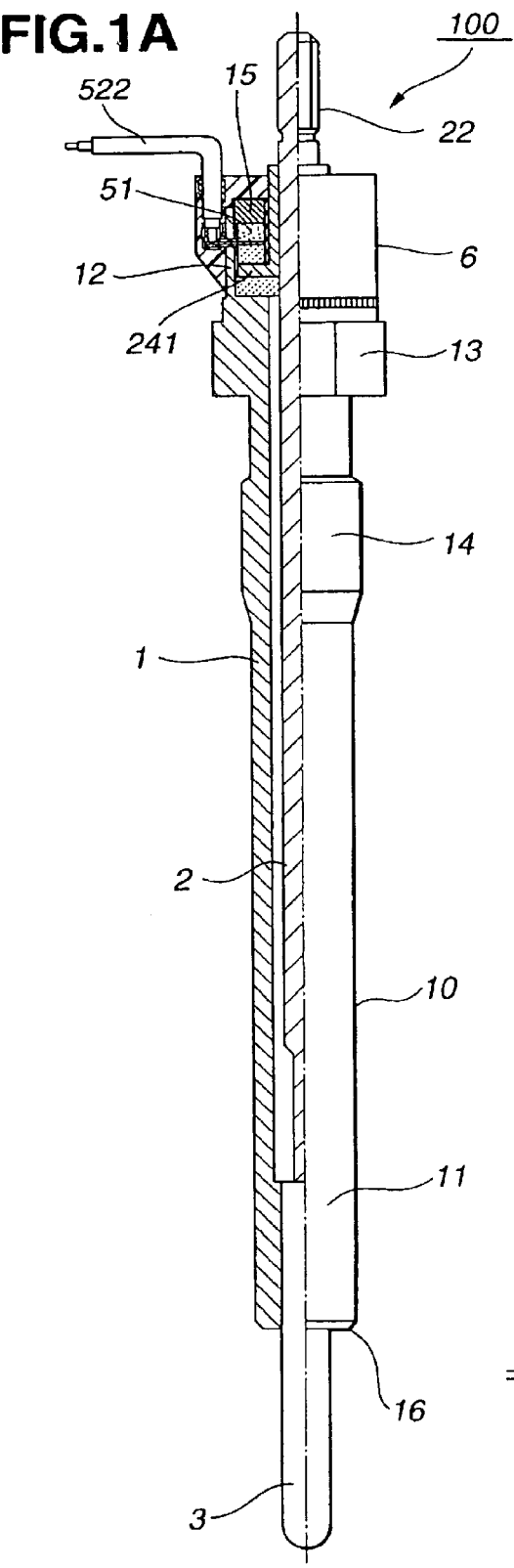
FIG. 1A is a half-sectional view of a glow plug according to a first embodiment of the present invention.

In the following embodiments, like parts and portions are designated by like reference numerals to thereby omit repeated descriptions thereof.

First Embodiment

The first embodiment will be now described below with reference to FIGS. 1 to 5. A glow plug 100 according to the first embodiment is designed for use in an internal combustion engine EG (see FIGS. 4A and 4B), and comprises a cylindrical housing 1, a center electrode 2 disposed in the housing 1, a sheath 3 partly fitted in the housing 1, a heater 4 disposed in the sheath 3 and electrically connected with the center electrode 2, a combustion pressure sensor 50 for detection of a combustion pressure of the engine EG and various insulating and sealing members 25, 41, 42 and 43.

The housing 1 is made of carbon steel, and includes a cylindrical housing shell 10 having front and rear end portions 11 and 12, a male threaded portion 14 formed between the front and rear end portions 11 and 12 for screwing the glow plug 100 into a plug hole EGH of the engine EG, a tool engaging portion 13 formed between the rear end portion 12 and the threaded portion 14 to be engaged with a tool, such as a wrench or spanner, for screwing the glow plug 100 in the plug hole EGH and a sealing portion 16 formed at a front end of the housing 1 as shown in FIG. 1A. The tool engaging portion 13 can be formed into any shape, such as hexagonal shape or a flatted round shape, engageable with the plug mounting tool. The sealing portion 16 of the housing 1 has a sealing face tapering down toward the front to be engaged directly or indirectly with a tapered face EGHT of the plug hole EGH as shown in FIGS. 1A and 4B, thereby providing an airtight seal between the glow plug 100 and the plug hole EGH. The formed position of the sealing portion 16 on the housing 1 is not limited to the above. Depending on the positional relationship with the tapered face EGHT of the plug hole EGH, the sealing portion 16 can alternatively be formed at any other appropriate position in a front side of the threaded portion 14.

Figure 2:
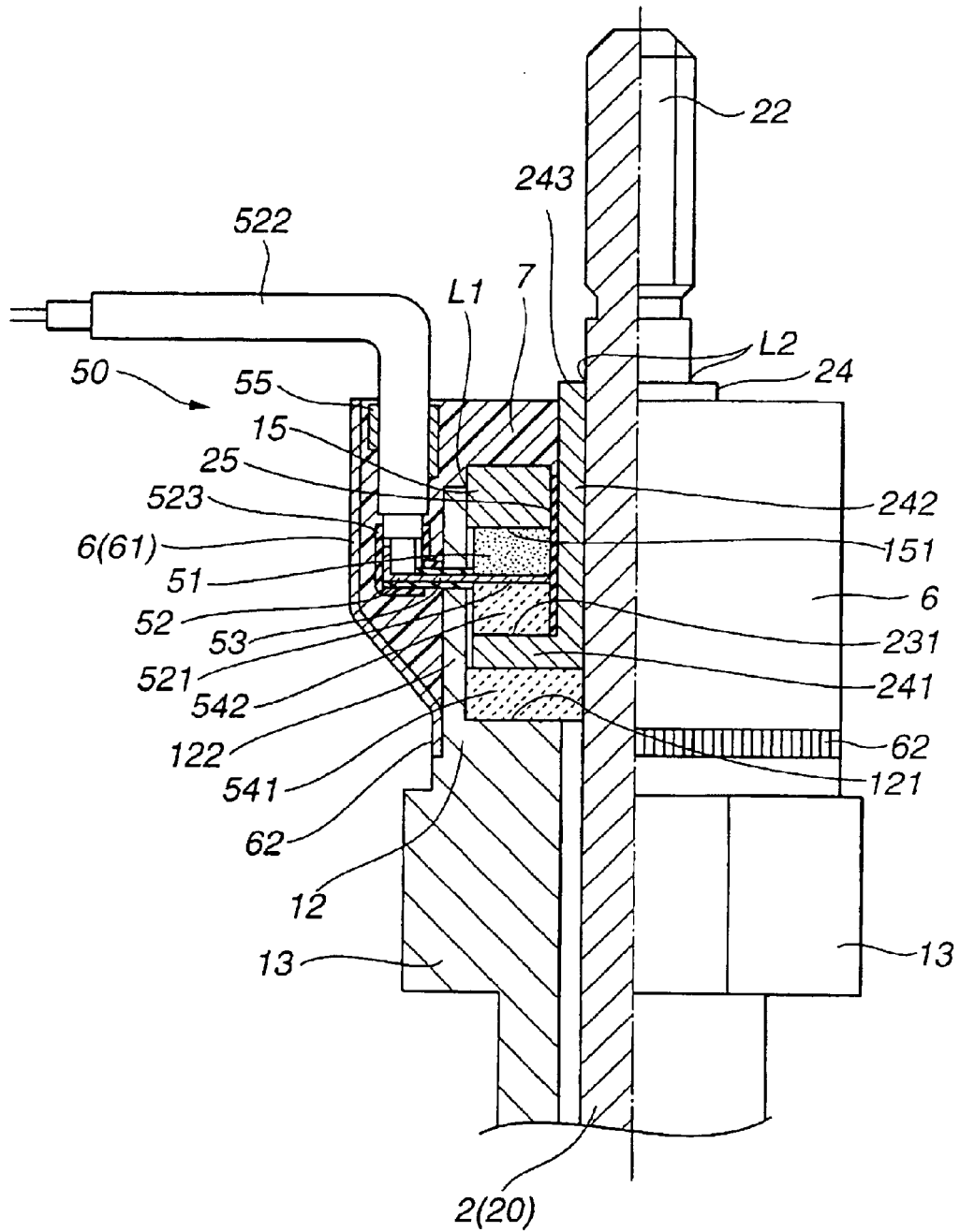
FIG. 2 is an enlarged half-sectional view of a rear end portion of the glow plug according to the first embodiment of the present invention.

The rear end portion 12 of the housing 1 has a rear-facing sensor seat 121 formed on an inner surface thereof and a cylindrical wall 122 extending from the sensor seat 121 toward the rear as shown in FIG. 2. An axially-extending slit or hole is formed in the cylindrical wall 122.

The housing 1 also includes a ring-shaped inward protrusion 15 protruding radially inwardly from a rear end of the cylindrical wall 122 and facing the sensor seat 121 as shown in FIG. 2. The housing shell 10 and the inward protrusion 15 are formed into separate pieces and joined together at a circumferential joint L1 between the inward protrusion 15 and the rear end of the cylindrical wall 122, so that the inward protrusion 15 becomes mechanically integral with the housing shell 10.

Figure 1B:
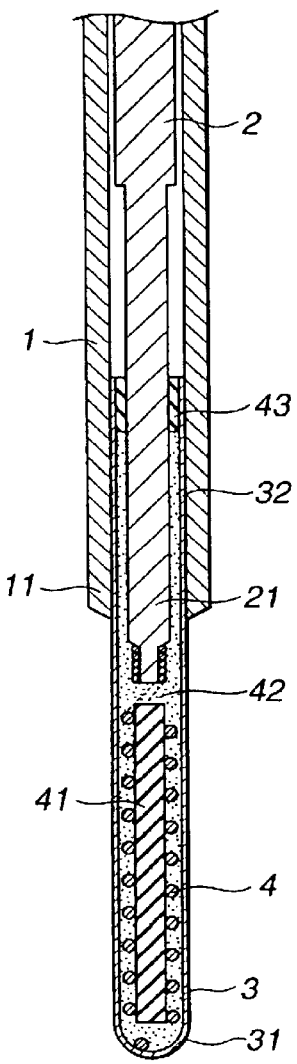
FIG. 1B is an enlarged sectional view of a front end portion of the glow plug according to the first embodiment of the present invention.

The sheath 3 is made of stainless steel and has a substantially semispherical closed front end portion 31 projecting from the housing 1 and a rear end portion 32 press-fitted in the front end portion 11 of the housing 1 as shown in FIG. 1B so as to airtightly fix an outer surface of the rear end portion 32 to an inner surface of the front end portion 11 and thereby prevent a high-pressure combustion from flowing into the insides of the housing 1 and the sheath 3. Herein, the press-fitting of the sheath 3 in the housing 1 allows a slight axially reciprocating displacement of the sheath 3 relative to the housing 1 upon receipt of an axial force.

The heater 4 is a metal wire made of e.g. a chromium-iron alloy or cobalt-nickel alloy and coiled around the insulating pole 41 as shown in FIG. 1B. A front end of the heater 4 is welded to the closed front end portion 31 of the sheath 3 for electrical connection between the heater 4 and the sheath 3, whereas a rear end of the heater 4 is wound around the center electrode 2 for electrical connection between the heater 4 and the center electrode 2. Through the application of a voltage between the center electrode 2 and the housing 1 to which the heater 4 is connected via the sheath 3, the heater 4 becomes energized and generates heat to aid the stating of the engine EG. The insulating powder material 42 is tightly packed into the sheath 3 so that the sheath 3 and the heater 4 are mechanically connected to each other. In order to prevent the leakage of the insulating powder material 42, the rubber packing 43 is fitted between the center electrode 2 and the rear end portion of the sheath 3.

The center electrode 2 is made of iron, and includes an electrode rod 20 having a front end portion 21 around which the heating element 40 is wound and a rear end portion 22 projecting from the rear end portion 12 of the housing 1 as shown in FIGS. 1B and 2. Threads are cut in the projecting rear end portion 22 of the electrode rod 20 for securing a connection terminal (not shown) with a nut (not shown).

The center electrode 2 also includes a flanged sleeve 24 provided around the electrode rod 20 at a location between the front and rear end portions 21 and 22 as shown in FIG. 2. The flanged sleeve 24 is L-shaped in half section, and includes a cylindrical portion 242 having a rear end 243 located in a rear side of the rear end portion 12 of the housing 1 and a ring-shaped outward protrusion 241 formed integral with the cylindrical portion 242 and protruding radially outwardly from a front end of the cylindrical portion 241. The electrode rod 20 and the sleeve 24 are formed into separate pieces and joined together at a circumferential joint L2 between the electrode rod 20 and the rear end 243 of the cylindrical portion 242, so that the sleeve 24 becomes mechanically integral with the electrode rod 20. The insulating tube 25 is fitted around the cylindrical portion 242 of the sleeve 24.

In the glow plug 100, there is a sensor installation space defined by the inward protrusion 15, the sensor seat 121 and the cylindrical wall 122 of the rear end portion 12 of the housing 1 and the cylindrical portion 242 of the sleeve 24 of the center electrode 2 for installing therein the combustion pressure sensor 50.

The combustion pressure sensor 50 includes a ring-shaped pressure-sensitive element 51, a ring-shaped electrode plate 521 and ring-shaped insulating spacers 541 and 542 fitted around the center electrode 2 as shown in FIG. 2. The insulating spacer 541, the outward protrusion 241 of the center electrode 2, the insulating spacer 542, the electrode plate 521 and the pressure-sensitive element 51 are seated on the sensor seat 121 in order of mention (from the side of the sensor seat 121) so that the pressure-sensitive element 51 is located between a front surface 151 of the inward protrusion 15 and a rear surface 231 of the outward protrusion 241. The inward protrusion 15 and the outward protrusion 241 thus function as parts of the combustion pressure sensor 50.

The pressure-sensitive element 51 is a piezoelectric element mainly made of lead titanate and polarized in the axial direction of the glow plug 100 so as to generate, when receiving axial compressive stress, electrical charge in response to variations in the compressive stress. In order for the glow plug 100 to have a smaller outer diameter, the inner diameter of the ring-shaped pressure-sensitive element 51 is made smaller than the inner diameter of the tool engaging portion 13 of the housing 1. Further, the pressure-sensitive element 51 is preloaded with the inward protrusion 15 and the outward protrusion 241 brought closer together to keep the outward protrusion 241, the insulating spacer 542, the electrode plate 521, the pressure-sensitive element 51 and the inward protrusion 15 into intimate contact with each other (as will be described later in detail).

Alternatively, the pressure-sensitive element 51 can be a piezoelectric element mainly made of e.g. lead zirconate titanate or barium titanate, an electrostriction element or any other element capable of generating electric charge in response to changes in mechanical stress applied thereto. The pressure-sensitive element 51 may alternatively be under no or tensile stress. However, the pressure-sensitive element 51 especially made of piezoelectric material is susceptible to rupture under tensile stress. Moreover, there arises a possibility of forming clearance between the sensor components and thereby decrease the displacements of the plug components due to backlash. It is thus most desirable that the pressure-sensitive element 51 be held under compressive stress. Although the pressure-sensitive element 51 has no electrode layers formed thereon in the first embodiment, it is alternatively possible to form electrode layers on axially opposite surfaces of the pressure-sensitive element 51.

The electrode plate 521 is made of an iron-nickel alloy, and has an output portion 53 protruding radially outwardly from the slit or hole of the cylindrical wall 122 of the housing 1 to read out the output of the pressure-sensitive element 51.

The insulating spacer 541 is made of alumina ceramic and interposed between the outward protrusion 241 and the sensor seat 121. Herein, the inward protrusion 15 has an inner diameter larger than the outer diameter of the cylindrical portion 242 of the sleeve 24 of the center electrode 2, and the outward protrusion 241 has an outer diameter smaller than the inner diameter of the cylindrical wall 122 of the housing 1. The housing 1 and the center electrode 2 are thus kept insulated from each other by means of the insulating spacer 541.

The insulating spacer 542 is made of alumina ceramic and interposed between the inward protrusion 15 and the pressure-sensitive element 51 to keep the pressure-sensitive element 51 and the electrode plate 521 insulated from the housing 1.

Further, the pressure-sensitive element 51 and the electrode plate 521 is kept insulated from the center electrode 2 with the insulating tube 25 fitted around the cylindrical portion 242 of the sleeve 24 and interposed between the pressure-sensitive element 51, the electrode plate 521 and the insulating spacer 542 of the combustion pressure sensor 50 and the cylindrical portion 242 of the sleeve 24.

As shown in FIG. 2, the glow plug 100 additionally includes a protective cover 6, a lead 522, an insulating tube 523, a lead brace 55 and a sealant 7.

The protective cover 6 is made of stainless steel, and includes a cover portion 61 covering therein the rear end portion 12 of the housing 1 and the output portion 53 of the electrode plate 521 and a front end portion 62 joined by laser welding to the outer surface of the rear end portion 12 of the housing 1.

Figure 1C:
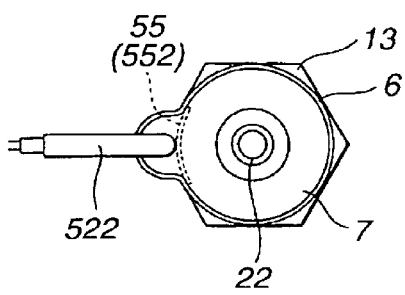
FIG. 1C is a top view of the glow plug according to the first embodiment of the present invention.
Figure 3A:
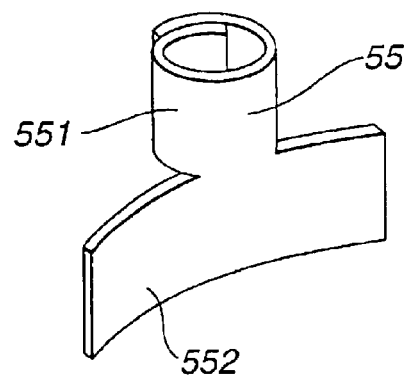
FIG. 3A is a perspective view of a lead brace of the glow plug according to the first embodiment of the present invention.
Figure 3B:
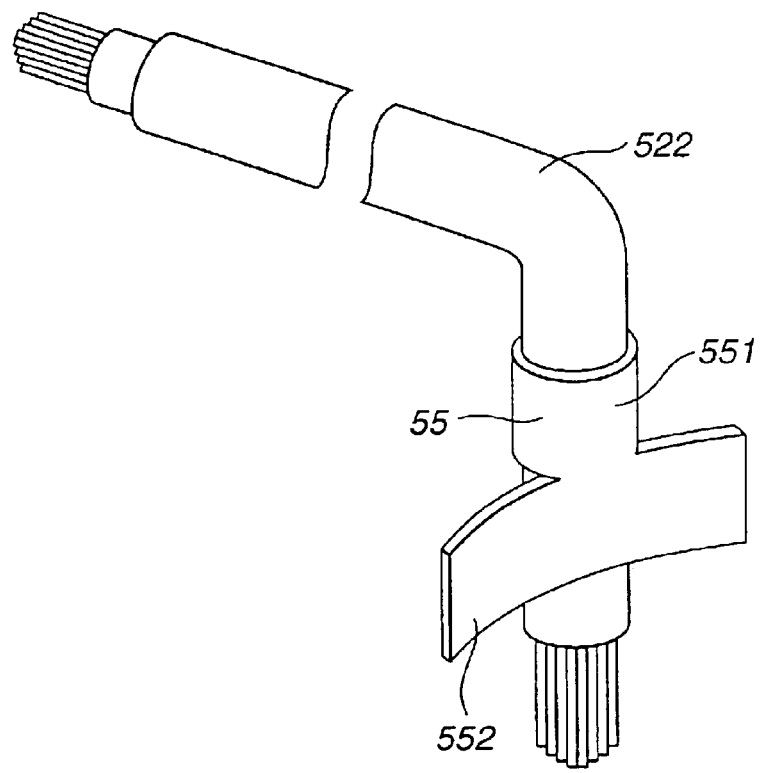
FIG. 3B is a schematic illustration of how the lead brace holds a lead.

The lead 522 is a braided wire, and has a bare front portion joined by spot welding to the output portion 53 of the electrode plate 521 to form an output circuit 52 through which the electrical charge of the pressure-sensitive element 51 is outputted to an ECU (not shown) via a charge amplifier (not shown). Based on the output of the pressure-sensitive element 51, the combustion pressure can be determined as one parameter for controlling the operations of the engine EG. The output portion 53 of the electrode plate 521 and the bare portion of the lead 522 are covered with the insulating tube 523 so as to be kept insulated from the other plug components. The lead 522 is braced by the lead brace 55. As shown in FIGS. 1C, 3A and 3B, the lead brace 55 has a holding portion 551 to hold therein the lead 522 and an arc-shaped joint portion 552 joined by spot welding to an inner surface of the protective cover 6. As the output portion 53 of the electrode plate 521 extends radially outwardly from the housing 1 and the lead 522 extends axially toward the rear, the lead 522 can be more easily drawn from an open rear end of the protective cover 6 to the ECU and set apart from the engine EG. This makes it possible to simplify the structures of the pressure-sensitive element 51 and the output circuit 52.

The sealant 7, made of a silicon resin, is filled into the protective cover 6 to seal the lead 522, the output portion 53 of the electrode plate 521, the inward protrusion 15 and the rear end portion 12 of the housing 1 as shown in FIG. 2, thereby preventing moisture and oil contents from adhering to the pressure-sensitive element 51, the electrode plate 521 and the lead 522 so as not to cause deteriorations in the electrical properties such as insulation resistance of the pressure-sensitive element 51, the electrode plate 521 and the lead 522 for improved reliability of the glow plug 100.

To mount the above-structured glow plug 100 in the engine EG, the glow plug 100 is screwed from its front end into the plug hole EGH by hooking the tool onto the tool engaging portion 13. The glow plug 100 is then airtightly fixed in the plug hole EGH by means of the treaded portion 14 in such a manner as to keep the sealing face 16 of the housing 1 in contact with the tapered face EGHT of the plug hole EGH and to arrange the front end portion 31 of the sheath 3 within a combustion chamber EGC of the engine EG, as shown in FIGS. 4A and 4B. As the tool engaging portion 13 is formed in a front side of the rear end portion 12 of the housing 1 and the pressure-sensitive element 51 and the other sensor components are installed radially inside the cylindrical wall 122 of the rear end portion 12 of the housing 1, the tool engaging portion 13 is sufficiently made large in radial thickness and attains high strength. Accordingly, there is no fear of defects such as deformation in the tool engaging portion 13 in the plug mounting operation with the tool. In addition, the tool can be prevented from hitting the pressure-sensitive element 51 during the plug mounting operation. This makes it possible to allow easy handling/mounting and provide high reliability for the glow plug 100.

In this state, the sealing face 16 receives an axially rearward force from the tapered surface EGHT. A part of the housing 1 between the sealing surface 16 and the threaded portion 14 contracts upon receipt of such an axially rearward force to slightly decrease the length of the part of the housing 1 between the sealing face 16 and the threaded portion 14. As the center electrode 2, the sheath 3 and the heather 4 are mechanically connected with each other as described above, the center electrode 2, the sheath 3 and the heather 4 become axially displaced toward the rear relative to the threaded portion 14 of the housing 1 by an amount corresponding to the contraction of the housing 1. The axial displacement of the center electrode 2 moves the outward protrusion 241 toward the rear to apply an axially compressive load onto the pressure-sensitive element 51 and thereby increase the total axial compressive stress on the pressure-sensitive element 51.

When the engine EG starts, the combustion pressure in the combustion chamber EGC varies with fuel combustion. The combustion pressure is exerted on the sheath 3 to cause the center electrode 2 to become displaced together with the sheath 3 as the center electrode 2 is mechanically connected to the sheath 3 via the heater 4, the insulating powder material 42 and the rubber packing 43. Then, the outward protrusion 241 is pushed toward the rear to cause variations in the compressive stress on the pressure-sensitive element 51. The pressure-sensitive element 51 produces an electrical signal, in response to the variations in the compression stress, for detection of the combustion pressure.

The glow plug 100 can be manufactured by the following procedure.

First, the housing shell 10, the sheath 3, the heater 4 and the electrode rod 20 are assembled together by press-fitting the rear end portion 32 of the sheath 3 in the front end portion 11 of the housing shell 10 with the heater 4 built in the sheath 3 and by placing the electrode rod 20 in the housing shell 10. Herein, the method for assembling the housing shell 10, the sheath 3, the heater 4 and the electrode rod 20 (including the placement of the heater 4 in the sheath 3, the connection of the heater 4 to the sheath 3 and to the electrode rod 20, the filling of the insulating powder material 42 into the sheath 3, the press-fitting of the sheath 3 into the housing shell 10) is conventional. The detailed illustrations and explanations of how to assemble the housing shell 10, the sheath 3, the heater 4 and the electrode rod 20 are thus omitted.

Figure 5:
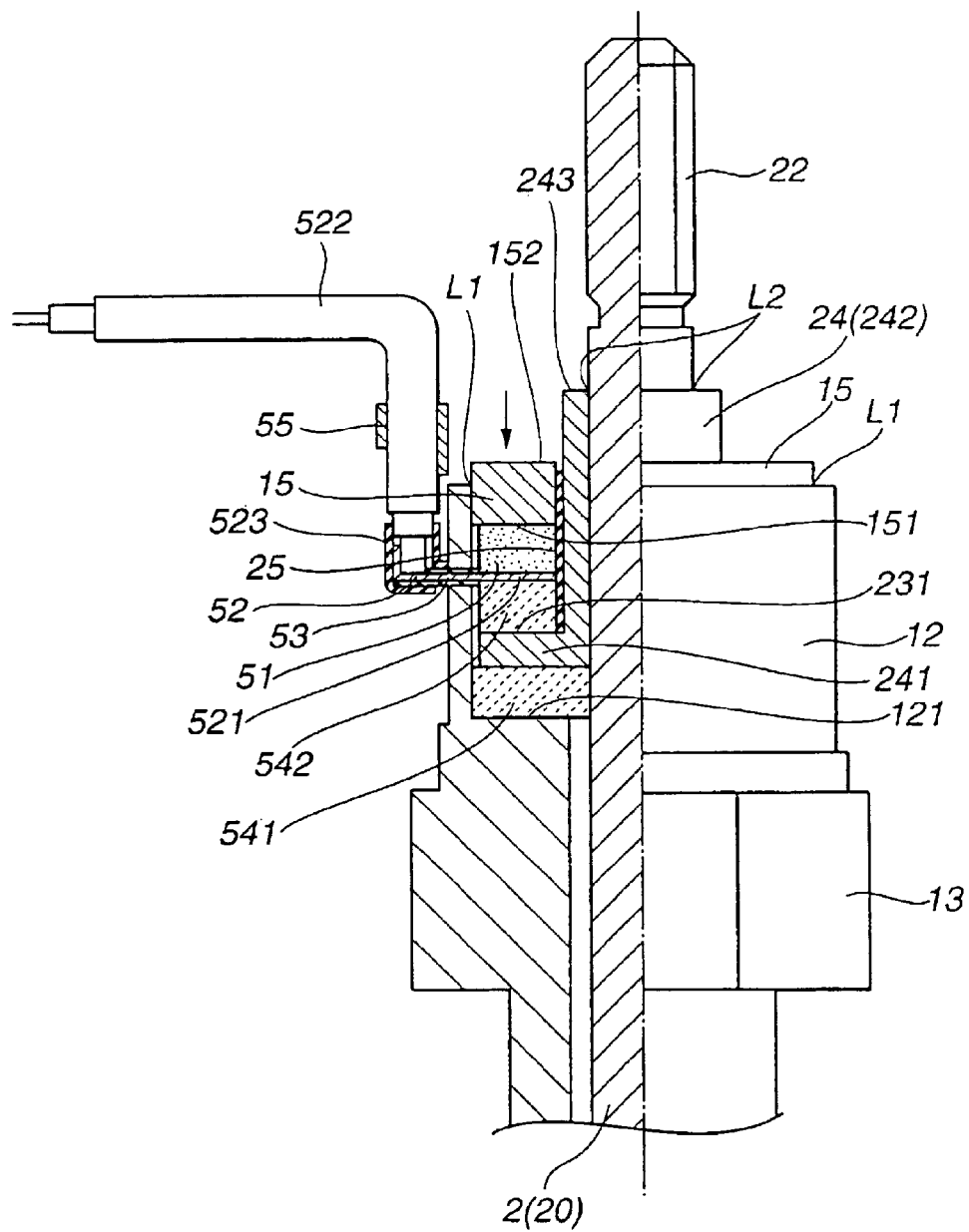
FIG. 5 is a schematic illustration of how to manufacture the glow plug according to the first embodiment of the present invention.

As shown in FIG. 5, the insulating spacer 541 is fitted around the electrode rod 20 and seated on the sensor seat 121 of the rear end portion 12 of the housing shell 10. The sleeve 24 is fitted around the electrode rod 20 so as to place the outward protrusion 241 on the rear side of the insulating spacer 541. Before or after fitting the sleeve 24 around the electrode rod 20, the insulating tube 25 is put around the cylindrical portion 242 of the sleeve 24. The insulating spacer 542 is fitted around the cylindrical portion 242 of the sleeve 24 and stacked on the rear side 231 of the outward protrusion 241 of the sleeve 24. Then, the electrode plate 521 is fitted around the cylindrical portion 242 of the sleeve 24 and stacked on a rear side of the insulating spacer 542 while allowing the output portion 53 to protrude radially outwardly from the slit or hole of the cylindrical wall 122 of the housing 1. The pressure-sensitive element 51 is fitted around the cylindrical portion 242 of the sleeve 24 and stacked on a rear side of the electrode plate 521. The inward protrusion piece 15 is fitted around the cylindrical portion 242 of the sleeve 24 and stacked on a rear side of the pressure-sensitive element 51, whereby the pressure-sensitive element 51 is located between the rear surface 231 of the outward protrusion 241 and the front surface 151 of the inward protrusion 15.

While applying an axially frontward force (indicated by an arrow of FIG. 5) to a rear surface 152 of the inward protrusion piece 15 and pushing the inward protrusion 15 toward the pressure-sensitive element 51, the inward protrusion 15 is joined at the joint L1 to the cylindrical wall 122 by laser welding so that the inward protrusion 15 becomes mechanically integral with the housing shell 10 (i.e. the housing 1 becomes an integral piece). The laser welding can be performed using a YAG laser. The force applied to the inward protrusion 15 is released after the laser welding, but the pressure-sensitive element 51 remains under compressive stress. In the above preloading/joining operation, the compressive stress on the pressure-sensitive element 51 can be thus adjusted appropriately and, even when either of the pressure-sensitive element 51, the insulating spacers 541 and 542 and other components has thickness tolerances, prevented from varying due to such dimensional tolerances. Alternatively, the inward protrusion 15 may be joined to the housing shell 10 by any other joining method, such as torch welding, caulking or adhesive bonding. The housing shell 10 may alternatively formed with a constriction and caulked at the constriction to the inward protrusion 15. In these cases, however, it would take a longer time period to fix the housing shell 10 and the inward protrusion 15 together while pushing the inward protrusion 15. It is thus desirable that the inward protrusion 15 be laser welded to the housing shell 10 from the rear side, so as to complete the joining operation in the shortest possible time and to allow the simplification of the structure for pushing the inward protrusion 15 during the joining operation. By laser welding the housing shell 10 and the inward protrusion 15 together quickly, the pressure-sensitive element 51 can be also prevented from deteriorating on thermal exposure during the laser welding.

The sleeve 24 is joined at the joint L2 to the electrode rod 20 by laser welding so that the sleeve 24 becomes integral with the electrode rod 20 (i.e. the center electrode 2 becomes an integral piece). The laser welding can be easily performed using e.g. a YAG laser, as the rear end 243 of the sleeve 24 located in the rear side of the inward protrusion 15 of the housing 1 is laser welded to the electrode rod 20 from the rear side. By laser welding the electrode rod 20 and the sleeve 24 together quickly, the pressure-sensitive element 51 can be also prevented from deteriorating on thermal exposure during the laser welding. It is alternatively possible to join the sleeve 24 to the electrode rod 20 by any other joining method, such as torch welding, caulking or adhesive bonding, or to form a constriction in the sleeve 24 and then caulk the sleeve 24 onto the electrode rod 20 at the constriction.

The lead 522 is joined by spot-welding to the output portion 53 of the electrode plate 521. The protective cover 6 is press-fitted around the housing 1 to cover the output portion 53 of the electrode plate 521, and then, joined at the front end portion 62 to the rear end portion 12 of the housing 1 by laser welding. The joint portion 552 of the lead brace 55 is joined by spot welding to the inner surface of the protective cover 6. Finally, the silicon resin is filled into the protective cover 6 so as to seal therein the lead 522, the output portion 53 of the electrode plate 521, the inward protrusion 15 and the rear end portion 12 of the housing 1 and hardened to form the sealant 7.

As described above, the pressure-sensitive element 51 is arranged between the front surface 151 of the inward protrusion 15 of the housing 1 and the rear surface 231 of the outward protrusion 241 of the center electrode 2. In addition, the center electrode 2 has a mechanical connection with the sheath 3 and the heater 4. Upon development of the combustion pressure, the center electrode 2 thus becomes axially displaced toward the rear together with the sheath 3 and the heater 4 so as to increase the compressive stress on the pressure-sensitive element 51. If the compression stress on the pressure-sensitive element decreases at the time of mounting the glow plug in the engine and at the time of increase of the combustion pressure as in the aforementioned glow plug of Japanese Laid-Open Patent Publication No. 2002-327919, there may arise a problem of canceling out all the compression stress exerted on the pressure-sensitive element and, from then on, obtaining no output of the pressure-sensitive element even through the application of the combustion pressure. In the glow plug 100, however, the compression stress on the pressure-sensitive element 51 increases at the time of mounting the glow plug 100 in the engine EG and at the time of increase of the combustion pressure. Thus, the glow plug 100 does not present such a problem and allows the pressure-sensitive element 51 to detect variations in the combustion pressure without fail. Further, the pressure-sensitive element 51 can be easily disposed between the inward protrusion 15 and the outward protrusion 241 by forming the housing 1 with the housing shell 10 and the inward protrusion 15 and by forming the center electrode 2 with the electrode rod 20 and the sleeve 24.

Second Embodiment

Figure 6:
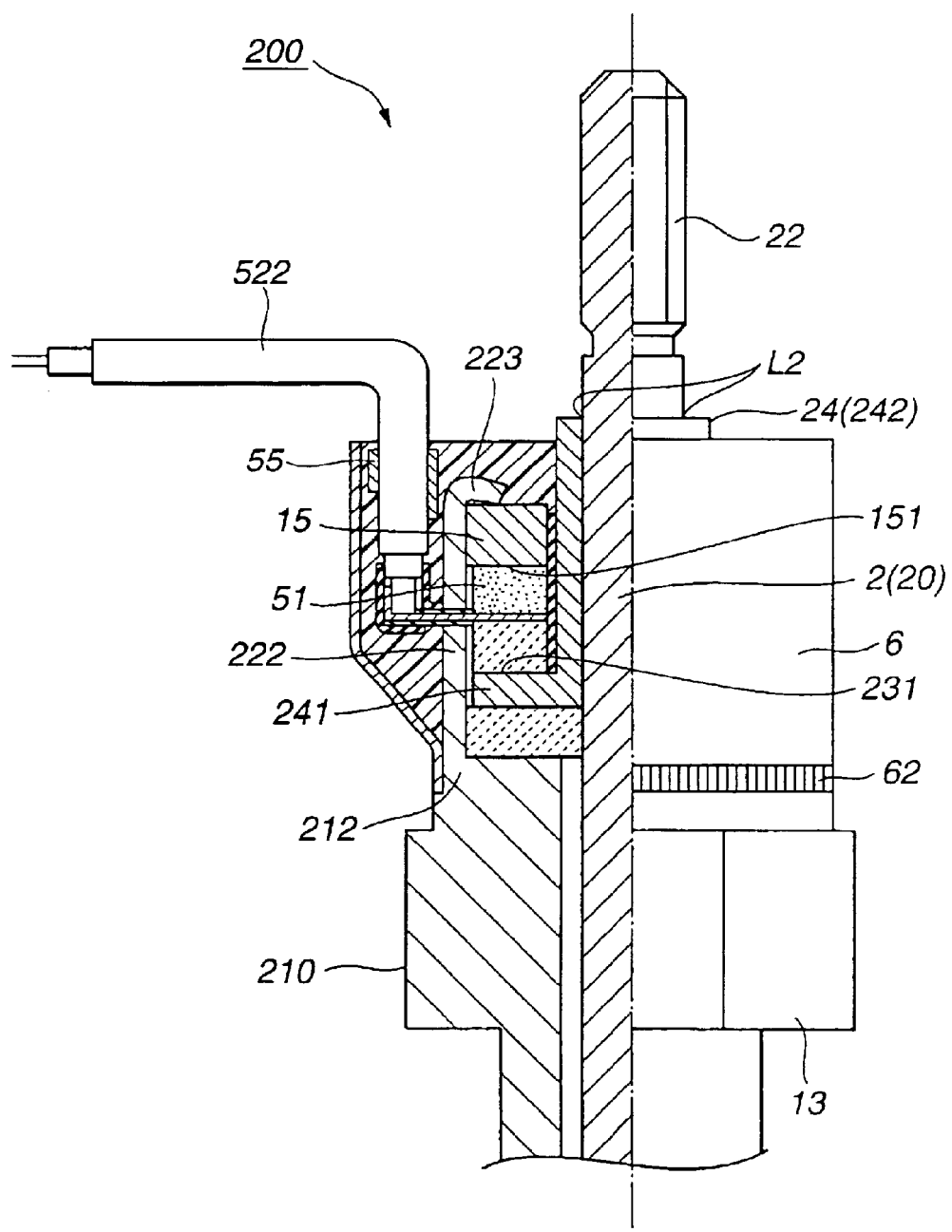
FIG. 6 is an enlarged half-sectional view of a rear end portion of a glow plug according to a second embodiment of the present invention

Next, the second embodiment will be described below with reference to FIG. 6. A glow plug 200 of the second embodiment is structurally the same as the first embodiment, except for its housing structure.

The housing 1 of the glow plug 200 has a housing shell 210 and an inward protrusion 15 formed into separate pieces. A rear end portion 212 of the housing shell 210 is formed with a cylindrical wall 222, and the pressure-sensitive element 51 and the other sensor components are disposed radially inside the cylindrical wall 222. The cylindrical wall 222 has a rear edge 223 caulked radially inwardly to the inward protrusion 15 so that the caulked edge 223 pushes the inward protrusion 15 toward the front. There is no need to join the inward protrusion 15 to the cylindrical wall 222 by e.g. laser welding.

Third Embodiment

Figure 7:
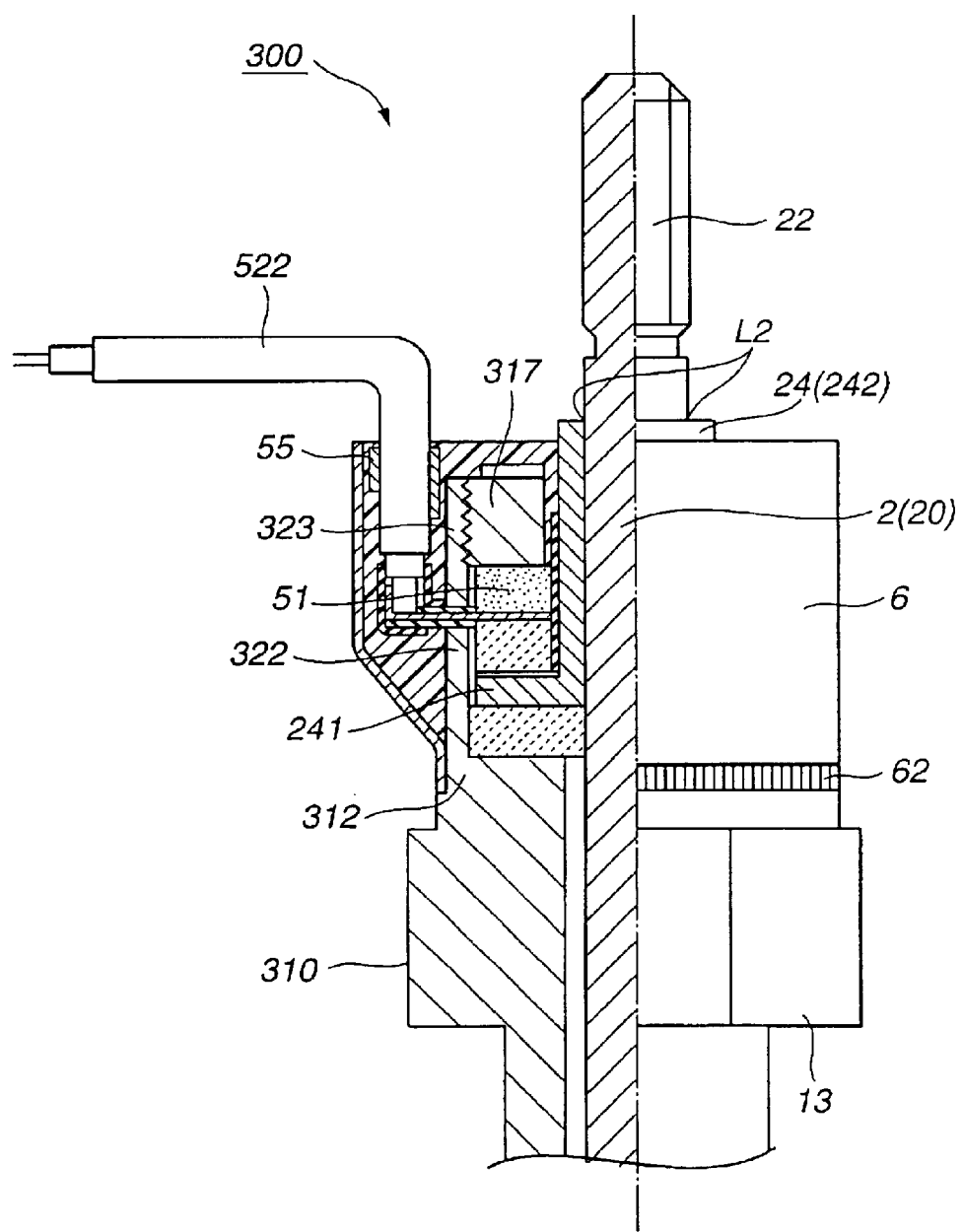
FIG. 7 is an enlarged half-sectional view of a rear end portion of a glow plug according to a third embodiment of the present invention.

The third embodiment will be described below with reference to FIG. 7. A glow plug 300 of the third embodiment is structurally the same as the first embodiment, except for its housing structure.

The housing 1 of the glow plug 300 has a housing shell 310 and an inward protrusion 317 formed into separate pieces. A rear end portion 312 of the housing shell 310 is formed with a cylindrical wall 323, and the pressure-sensitive element 51 and the other sensor components are disposed radially inside the cylindrical wall 323. The cylindrical wall 323 has female threads formed in an inner circumferential surface thereof, whereas the inward protrusion 317 has male threads formed in an outer circumferential surface thereof. Thus, the inward protrusion 317 can be easily joined to the housing shell 310 by engagement of the male threads and the female threads in such a manner as to push the inward protrusion 317 toward the front.

Fourth Embodiment

Figure 8:
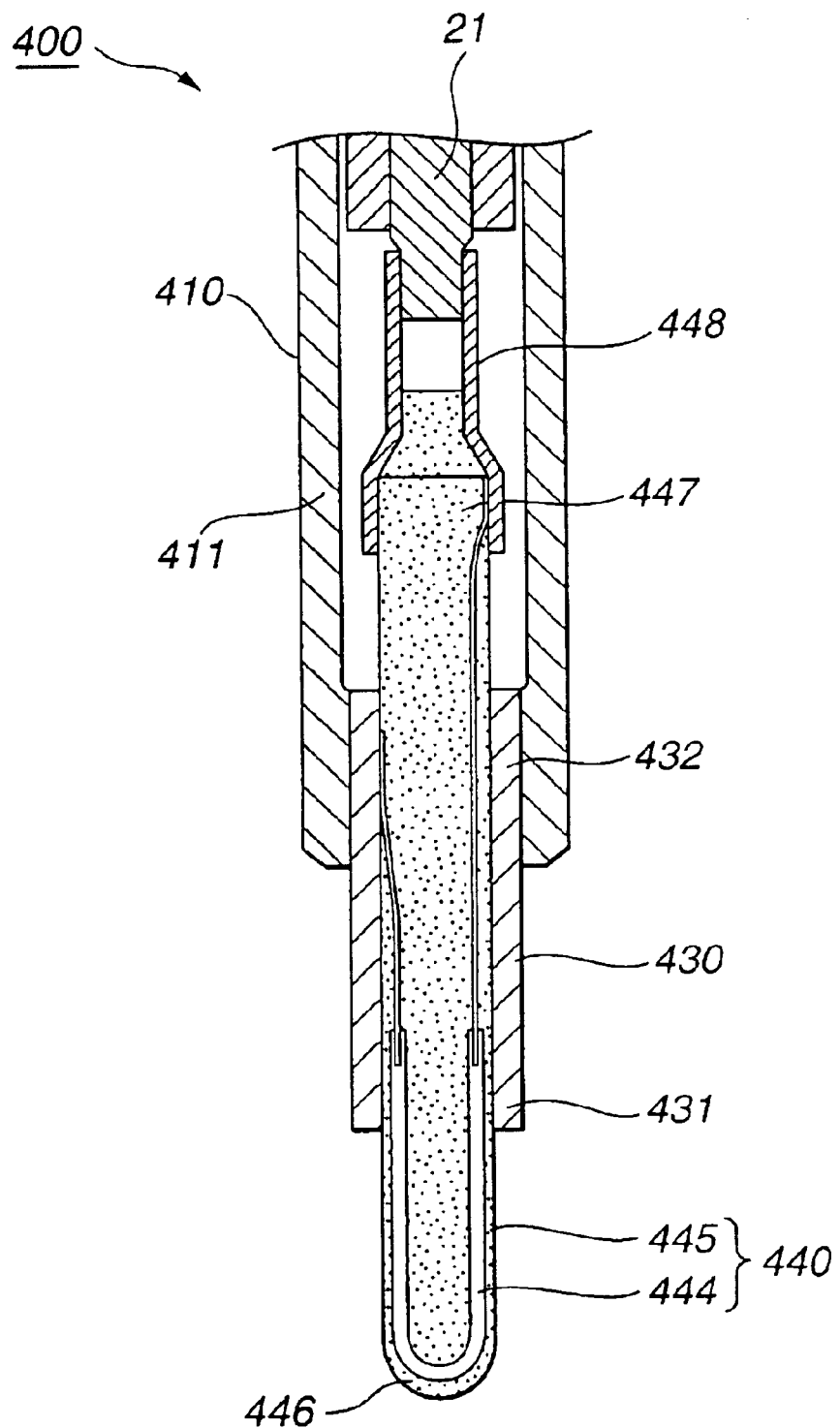
FIG. 8 is an enlarged sectional view of a front end portion of a glow plug according to a fourth embodiment of the present invention.

The fourth embodiment will be described below with reference to FIG. 8. A glow plug 400 of the fourth embodiment is structurally the same as the first embodiment, except that its heater structure.

The glow plug 400 includes a housing 410, a sheath 430 with an open front end portion 431, a ceramic heater 440 and a cap lead 448. A rear end portion 432 of the sheath 430 is welded into a front end portion 411 of the housing 410. The ceramic heater 440 is disposed in the sheath 430 in such a manner that a front end portion 446 of the heater 440 protrudes from the front end portion 431 of the sheath 430, and has a nonmetallic heating element 444 and a silicon nitride ceramic substrate 445 enclosing therein the heating element 444. One end of the heating element 444 is exposed at the surface of an axially middle portion of the ceramic heater 440 and connected to the sheath 430. The other end of the heating element 444 is exposed at the surface of a rear end portion 447 of the ceramic heater 440 and connected to the cap lead 448. Front and rear end portions of the cap lead 448 are press-fitted around the rear end portion 447 of the ceramic heater 440 and the front end portion 21 of the center electrode 2, respectively. The heating element 444 thus becomes energized by the passage of electrical current through the center electrode 2, the cap lead 448, the heating element 444, the sheath 439 and then the housing 410 so as to generate heat and thereby raise the temperature of the front end portion 446 of the ceramic heater 440.

As the ceramic heather 440 and the center electrode 2 are connected with each other by means of the cap lead 448, the displacement of the ceramic heater 440 is transmitted to the center electrode 2 via the cap lead 448. It is thus possible to allow the center electrode 2 to become displaced largely and cause large variations in the compressive stress on the pressure-sensitive element 51 in response to the variations in the combustion pressure for a larger output of the pressure-sensitive element 51.

The entire contents of Japanese Patent Application No. 2003-071641 (filed on Mar. 17, 2003) are herein incorporated by reference.

Although the present invention has been described with reference to specific embodiments of the invention, the invention is not limited to the above-described embodiments. Various modification and variation of the embodiments described above will occur to those skilled in the art in light of the above teaching. For example, the glow plug 200 or 300 may alternatively be equipped with a ceramic heater in the second or third embodiment. The scope of the invention is defined with reference to the following claims.

What is claimed is:

1. A glow plug for an internal combustion engine, comprising:

a cylindrical housing having front and rear housing end portions, an inward protrusion protruding radially inwardly from the rear housing end portion, a threaded portion formed between the front and rear housing end portions for screwing the glow plug in a plug hole of the engine and a sealing portion formed on a front side of the threaded portion for engaging the housing with a given portion of the plug hole to form an airtight seal between the housing and the plug hole;

a sheath having a front sheath end portion projecting from the housing and a rear sheath end portion airtightly fixed in the front housing end portion;

a heater disposed in the sheath and generating heat upon energization thereof;

a center electrode disposed in the housing and having a front electrode end portion, a rear electrode end portion projecting from the housing and an outward protrusion fixed to the center electrode or integral with the center electrode so as to protrude radially outwardly at a location between the front and rear electrode end portions, the center electrode being electronically connected at the front electrode end portion with the heater and mechanically connected with the sheath; and a combustion pressure sensor having a pressure-sensitive element held between a front surface of the inward protrusion and a rear surface of the outward protrusion to generate an electrical signal in response to variations in stress applied thereto.

2. A glow plug according to claim 1, the housing having a tool engaging portion formed between the rear housing end portion and the threaded portion to be engageable with a plug mounting tool, and the outward protrusion and the pressure-sensitive element being located radially inside the rear housing end portion.

3. A glow plug according to claim 2, wherein the pressure-sensitive element is ring-shaped and has an inner diameter smaller than an inner diameter of the tool engaging portion of the housing.

4. A glow plug according to claim 1, further comprising:

an output circuit for outputting the electrical signal from the pressure-sensitive element, the output circuit including an output electrode and a lead, the output electrode being connected to the pressure-sensitive element and having a portion protruding radially outwardly from the housing, the lead being connected to the protruding portion of the output electrode and extending axially rearwardly; and a protective cover covering therein the rear housing end portion and the output circuit and having an open rear end through which the lead extends externally of the protective cover.

5. A glow plug according to claim 1, further comprising a resinous sealant to seal therein the rear housing end portion.

6. A method of manufacturing a glow plug, comprising:

disposing a heater in a sheath;

fitting a rear end portion of the sheath into a cylindrical housing shell, the housing shell having a rear end portion formed with a sensor seat on an inner surface thereof;

inserting an electrode rod into the housing shell;

after said inserting, placing a first piece that defines an outward protrusion on the electrode rod, a pressure-sensitive element and a second piece that defines an inward protrusion on the housing shell, on the sensor seat of the housing shell so as to hold the pressure-sensitive element between a rear surface of the outward protrusion and a front surface of the inward protrusion;

while pushing the second piece toward the front and applying compressive stress to the pressure-sensitive element, fixing the second piece to the housing shell; and fixing the first piece to the electrode rod.

7. A method according to claim 6, further comprising interposing an insulating member between the seat face and the outward protrusion.

8. A method according to claim 6, wherein the first piece has a rear end located in a rear side of the rear end portion of the housing when placed on the sensor seat, and fixed at the rear end to the electrode rod.

9. A glow plug for an internal combustion engine, comprising:

a cylindrical housing having front and rear end portions, a threaded portion formed between the front end and rear end portions for screwing the glow plug into a plug hole of the engine and a sealing portion formed on a front side of the threaded portion for engaging the housing with a given portion of the plug hole to form an airtight seal between the housing and the plug hole;

a sheath having a front sheath end portion projecting from the housing and a rear sheath end portion airtightly fixed in the front end portion of the housing;

a heater disposed in the sheath and generating heat upon energization thereof;

a center electrode disposed in the housing and having a rear electrode end portion projecting from the housing, the center electrode being electrically connected with the heater and mechanically connected with the sheath or the sheath and the heater; and a combustion pressure sensor including a pressure-sensitive element that converts an axial displacement of the sheath or the sheath and the heater caused by a variation in combustion pressure into an electrical signal and being configured to have compressive stress increasingly applied to the pressure-sensitive element by screwing the glow plug into the plug hole and increased with increase in the combustion pressure.

10. A glow plug according to claim 9, wherein the pressure-sensitive element is ring-shaped and has an inner diameter smaller than an inner diameter of the threaded portion of the housing.

* * * * *